US011797858B2

(12) United States Patent
Hakobyan et al.

(10) Patent No.: US 11,797,858 B2
(45) Date of Patent: Oct. 24, 2023

(54) TRANSLATION OF TRAINING DATA BETWEEN OBSERVATION MODALITIES

(71) Applicant: Robert Bosch GmbH, Stuttgart (DE)

(72) Inventors: Gor Hakobyan, Stuttgart (DE); Kilian Rambach, Stuttgart (DE); Jasmin Ebert, Heidelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 482 days.

(21) Appl. No.: 17/015,519

(22) Filed: Sep. 9, 2020

(65) Prior Publication Data

US 2021/0081762 A1 Mar. 18, 2021

(30) Foreign Application Priority Data

Sep. 18, 2019 (DE) .......................... 102019214200.1

(51) Int. Cl.
*G06N 3/084* (2023.01)
*G06N 3/082* (2023.01)
(Continued)

(52) U.S. Cl.
CPC ............. *G06N 3/084* (2013.01); *G06F 18/24* (2023.01); *G06N 3/045* (2023.01); *G06N 3/082* (2013.01);
(Continued)

(58) Field of Classification Search
CPC ........ G06N 3/084; G06N 3/045; G06N 3/082; G06V 10/82; G06V 10/774; G06V 20/56; G06V 30/2552; G06F 18/24
(Continued)

(56) References Cited

U.S. PATENT DOCUMENTS

2018/0336471 A1* 11/2018 Rezagholizadeh .... G06N 3/047
2019/0147320 A1* 5/2019 Mattyus ............... G06V 20/182
382/155
(Continued)

OTHER PUBLICATIONS

Olut, et al., "Generative Adversarial Training for MRA Image Synthesis Using Multi-contrast MRI", Prime 2018, pp. 147-154 (Year: 2018).*

(Continued)

*Primary Examiner* — Tsu-Chang Lee
(74) *Attorney, Agent, or Firm* — NORTON ROSE FULBRIGHT US LLP; Gerard Messina

(57) ABSTRACT

A method for training a generator. The generator is supplied with at least one actual signal that includes real or simulated physical measured data from at least one observation of the first area. The actual signal is translated by the generator into a transformed signal that represents the associated synthetic measured data in a second area. Using a cost function, an assessment is made concerning to what extent the transformed signal is consistent with one or multiple setpoint signals, at least one setpoint signal being formed from real or simulated measured data of the second physical observation modality for the situation represented by the actual signal. Trainable parameters that characterize the behavior of the generator are optimized with the objective of obtaining transformed signals that are better assessed by the cost function. A method for operating the generator, and that encompasses the complete process chain are also provided.

21 Claims, 7 Drawing Sheets

(51) Int. Cl.
    *G06F 18/24*     (2023.01)
    *G06N 3/045*     (2023.01)
    *G06V 10/774*     (2022.01)
    *G06V 10/82*     (2022.01)
    *G06V 20/56*     (2022.01)
    *G06V 30/24*     (2022.01)

(52) U.S. Cl.
    CPC ............ *G06V 10/774* (2022.01); *G06V 10/82* (2022.01); *G06V 20/56* (2022.01); *G06V 30/2552* (2022.01)

(58) Field of Classification Search
    USPC .......................................................... 706/15
    See application file for complete search history.

(56) References Cited

U.S. PATENT DOCUMENTS

| | | | |
|---|---|---|---|
| 2019/0171223 A1* | 6/2019 | Liang | G06N 3/088 |
| 2020/0356835 A1* | 11/2020 | Robinson | G06N 3/088 |
| 2021/0073671 A1* | 3/2021 | Puri | G06N 20/00 |

OTHER PUBLICATIONS

Arnelid, Henrik: "Sensor Modelling with Recurrent Conditional GANs. Recurrent Conditional Generative Adversarial Networks for Generating Artficial Real-Valued Time Series", Master's Thesis, Chalmers University of Technology, Gothenburg, Sweden, (2018), pp. 1-41, https://hdl.handle.net/20.500.12380/256175.

El Sallab, et al: "LiDAR Sensor modeling and Data augmentation with GANs for Autonomous driving", (2019) Proceedings of 36th International Conference on Machine Learning, California, PMLR 97, 2019, pp. 1-9, URL: https://arxiv.org/pdf/1905.07290.pdf.

Uricar, et al.: "Yes, we GAN: Applying Adversarial Techniques for Autonomous Driving", In: IS&T International Symposium on Electronic Imaging, 2019 Autonomous Vehicles and Machines Conference, 2019, Article—No. 048 (16S:)—ISSN 2470-1173: https://doi.org/10.2352/ISSN.2470-1173.2019.15.AVM-048, pp. 1-17.

* cited by examiner

TRANSLATION OF TRAINING DATA BETWEEN OBSERVATION MODALITIES

FIELD

The present application claims the benefit under 35 U.S.C. § 119 of German Patent Application No. DE 102019214200.1 filed on Sep. 18, 2019, which is expressly incorporated herein by reference in its entirety.

FIELD

The present invention relates to the generation of training data for systems which, based on the physical observation of areas, derive decisions for the behavior of vehicles and other technical systems.

BACKGROUND INFORMATION

To allow a vehicle to move at least partially automatedly in road traffic, it is necessary to detect the surroundings of the vehicle and initiate countermeasures if a collision with an object in the surroundings of the vehicle is imminent. The creation of a surroundings representation and localization are also necessary for safe automated driving.

Machine learning modules are often used to allow decisions to be derived regarding the further behavior of the host vehicle based on the physical observation of the vehicle surroundings. Analogously to a human driver, who prior to receiving a driver's license typically drives for less than 100 hours and covers less than 1000 km, machine learning modules are also able to generalize knowledge, acquired from a limited supply of training data, to numerous other situations that were not a subject of the training.

Since there is no single physical imaging modality that provides high-quality measured data and an unambiguous decision for the further behavior under all possible circumstances, it is advantageous to provide multiple imaging modalities at the same vehicle.

SUMMARY

Within the scope of the present invention, a method for training a generator for synthetic measured data is provided. In accordance with an example embodiment of the present invention, the generator is used to convert real or simulated physical measured data, which relate to the observation of a first area with a first physical observation modality Mod_A, into synthetic measured data. The measured data recorded with first modality Mod_A belong to a first space X that is defined by first modality Mod_A; i.e., the measured data "live" in this first space X. These synthetic measured data relate to the observation of a second area, with a second physical observation modality Mod_B, that at least partially overlaps the first area. The synthetic measured data belong to a second space Y that is defined by second modality Mod_B; i.e., the synthetic measured data "live" in this second space Y. The phrase "live in a certain space" is also used in this sense in the following discussion.

In particular those modalities that in each case deliver signals from which the presence and/or the type of objects present in the surroundings of a vehicle may be deduced are suitable as observation modalities. The observation modalities may be based in particular, for example, on different physical contrast mechanisms, and may thus be supplemented in such a way that the gaps that remain in the observation that is carried out with only one modality are deduced by one or multiple further modalities.

At the same time, this means that the areas observed with modalities Mod_A and Mod_B will generally not be completely congruent, since each modality has its strengths and weaknesses. In particular, the resolutions and ranges of modalities Mod_A and Mod_B will not be equal.

All real measured data recorded with modalities Mod_A and Mod_B may be preprocessed in any manner. For example, the optical flow may be computed from a video image. For example, a synthetic aperture radar image may be generated from radar data.

The primary useful application of the synthetic measured data to be generated with the generator is to reduce the overall outlay of resources for training machine learning modules which process physical measured data that are detected with multiple modalities Mod_A and Mod_B. A significant part of this overall outlay lies in acquiring the training data. Thus, for example, human labor is used to move measuring vehicles, which are equipped with cameras and/or other sensors, through traffic and to detect a number of traffic situations with sufficient variability. Very often, a situation occurs in which training data are already available that relate to a first observation modality Mod_A, but it would be desirable to train the machine learning module to process training data obtained with a second observation modality Mod_B, or also with a fusion of the two observation modalities Mod_A and Mod_B. For example, when testing a camera-based system for recognizing objects in the vehicle surroundings, it may turn out that in certain situations the image quality is too poor, and it may be desirable to teach the system to also recognize the objects based on radar data. Likewise, it may be desirable to train a system that operates based solely on radar data, even though up to that point only training data for a camera-based system have been detected. Thus far, in such situations it has not been possible to capitalize on a large quantity of camera images that are already available. Precisely for this reason, the training method opens the way for the generator.

Within the scope of the example training method, the generator is supplied with at least one actual signal that includes real or simulated physical measured data from at least one observation of the first area. The behavior of this generator is characterized by at least one set of trainable parameters. Thus, in the next step when the generator translates the actual signal into a transformed signal, which represents the associated synthetic measured data and thus "lives" in the space of the physical measured data recorded with second observation modality Mod_B, this then takes place according to the trainable parameters.

A cost function is used to assess the extent to which the transformed signal is consistent with one or multiple setpoint signals. At least one setpoint signal is formed from real or simulated measured data of second physical observation modality Mod_B, which relate to the situation represented by the actual signal. The trainable parameters that characterize the behavior of the generator are optimized with the objective of obtaining transformed signals that are better assessed by the cost function.

Thus, after conclusion of this training, the generator has learned a map made up on the one hand of space X of the physical measured data that have been obtained by observation with first physical observation modality Mod_A, and on the other hand of space Y of the simulated measured data, which are equivalent to the measured data obtained with second physical observation modality Mod_B. Thus, a large supply of physical measured data that have been recorded in space X with the first physical observation modality may be utilized to acquire new training data that "live" in space Y of the measured data obtained with modality Mod_B. Thus, the acquisition of new training data in space Y then represents, to a lesser extent than before, a bottleneck for the training of the machine learning module for the purpose of drawing conclusions, sought within the scope of the particular application, no longer based just on measured data obtained with modality Mod_A, but also on measured data obtained with modality Mod_B. Thus, for example, recognition of objects may be trained with a machine learning module that is no longer based just on images, but alternatively or also in combination, is based on radar data, for example.

The measured data generated with physical observation modalities Mod_A and Mod_B typically "live" in very different spaces, whose dimensions in each case also have a completely different semantic or physical meaning. Thus, for example, an image is usually present as a collection of pixels, each of which indicates intensity values and/or color values for certain locations. In contrast, radar data are present, for example, as a radar spectrum or as a collection of reflections, with which, for example, a direction in the form of one or multiple angles, a distance, an intensity, and optionally also a speed may be associated in each case. In addition, for example the range of a radar is significantly larger than that of a camera, while on the other hand the angular resolution is smaller than for a camera. This is all the more surprising since the partial overlap of the areas that are observed with the two modalities is already sufficient for the generator to be able to learn the translation between these very different spaces.

Checking the extent to which the transformed signal is consistent with one or multiple setpoint signals may take place in various ways. For example, the cost function may assess the extent to which the generator maps actual learning signals from a predefined source onto a suitable, predefined setpoint signal. However, such an association by the generator is not a mandatory requirement to allow the synthetic measured data, generated by the generator, to be utilized equivalently with physical measured data, obtained by actual observation with second physical observation modality Mod_B, for the further training of the machine learning module. Rather, for this purpose it is also sufficient, for example, when the synthetic measured data are not distinguishable from the measured data, "living" in same space Y, obtained with modality Mod_B.

Therefore, in one particularly advantageous embodiment of the present invention, the cost function contains a GAN term that assumes better values the more indistinguishable the transformed signal according to a discriminator module is from a predefined quantity of setpoint signals. The discriminator module is additionally trained to distinguish transformed signals from setpoint signals.

In this example embodiment of the present invention, generator G is embedded in a conditional generative adversarial network, or conditional GAN for short. Generator G obtains actual signals x, and optionally samples z drawn from a (normally distributed, for example) multidimensional random variable, as input and attempts to generate from each actual signal x a transformed signal y' which is preferably indistinguishable from an associated setpoint signal y. In this context, "conditional" means that generator G maps input x (optionally together with samples z) onto an output G(x,z) =:y' that relates to the same setting. Thus, for example, all actual signals x are not mapped onto same output y' which is the most difficult to distinguish from a given quantity of setpoint signals y. Discriminator module D is needed only during the training, and is no longer used during the subsequent generation of training data using generator G, or during the further subsequent use of these training data for training the actual machine learning module for the intended application.

The GAN term may, for example, assume the following form $L_{cGAN}(G, D)$:

$$L_{cGAN}(G,D) = E_{x,y}[\log D(x,y)] + E_{x,y}[\log(1-D(x,G(x,z)))],$$

where $E_{x,y}$ denotes the expected value (sample mean) over pairs of x and y. Similarly, $E_{x,z}$ denotes the expected value over pairs of x and z. Generator G seeks to minimize $L_{cGAN}(G, D)$, while discriminator D seeks to maximize $L_{cGAN}(G, D)$. Optimal generator G* is then the solution of the optimization problem $$G^* = \mathrm{argmin}_G \max_D L_{cGAN}(G, D).$$

Where $$\max_D$$

denotes the maximization of $L_{cGAN}(G, D)$ over the parameters of discriminator D. Accordingly, $$\mathrm{argmin}_G$$

denotes the minimization over the parameters of generator G.

In one further particularly advantageous embodiment of the present invention, the cost function additionally contains a similarity term that assumes better values the greater the similarity of the transformed signal is according to a predefined metric to the setpoint signals. This has an even stronger effect against a possible tendency of the generator to optimize the indistinguishability based solely on a numerical criterion, and for this purpose to seek "simple paths" which with regard to the intended application do not achieve the desired result. For example, if it is particularly difficult to convert a certain type of object from a depiction in the form of an optical image into a depiction in the form of radar data, the generator cannot simply "grab" a better value of $L_{cGAN}(G, D)$ by merely having this difficult object disappear. This is thwarted by the similarity term. One example of a similarity term is $$L_{L1}(G) = E_{x,y,z}[\|y - G(x,z)\|_1]$$

In principle, any metric other than the L1 metric may also be used.

In one further advantageous embodiment of the present invention, the cost function additionally contains an application term that measures desirable properties of the transformed signal as such for the intended application. This application term is also referred to as "perceptual loss" $L_P(G)$. The application term is not constrained to being a function only of the end result of the translation. Rather, it may also be a function, for example, of intermediate results of the translation. When the generator contains a multilayer neural network, for example, the intermediate results may also be removed on the hidden layers between the input layer and the output layer.

The application term may, for example, measure whether the setting represented by the transformed signal is plausible within the meaning of the particular application. Thus, for example, a transformed signal according to which an automobile is three times higher or wider than customary, or moves in an urban area at approximately the speed of sound, is discarded. Alternatively or in combination, for example a comparison to setpoint signals on an abstract plane may also be inserted into the application term. Thus, for example, a representation that generates an autoencoder or some other artificial neural network (ANN) from the transformed signal may be compared to representations that generate the same ANN from setpoint signals.

By use of the similarity term and the application term, the optimization problem as a whole may be written, for example, as $$G^* = \underset{G}{\operatorname{argmin}} \max_{D} L_{cGAN}(G,D) + \lambda L_{L1}(G) + \gamma L_P(G).$$

where $\lambda$ and $\gamma$ are hyperparameters that weight the various cost function terms.

In one further particularly advantageous embodiment of the present invention, a back-generator module is trained to back-translate transformed signals into signals of the type of the actual signal. This means that the back-translated actual signals "live" in the same space as the original actual signals. The cost function then additionally contains a back-GAN term. This back-GAN term assumes better values the more indistinguishable the back-translated signals according to a further discriminator module are from the actual signals.

The further discriminator module is trained to distinguish the back-translated signals from the actual signals. In addition, the cost function also contains a consistency term. This consistency term is a measure for the extent that actual signals are identically reproduced by the back-generator module during translation by the generator module.

During this type of training, the architecture in which the generator is incorporated is expanded from a conditional GAN to a CycleGAN. The significant advantage is that the setpoint signals no longer have to relate to the same settings as the actual signals or actual depictions. The major strength of CycleGANs is that they are able to translate data between domains that are characterized in each case by unpaired sets of examples.

This may significantly simplify and reduce the cost of the training, in particular when the generator is to translate the actual signal not only in space Y of the measured data recorded with second physical observation modality Mod_B, but also in spaces that belong to further observation modalities. The greater the number of modalities to be taken into account, the more difficult it becomes to record the same setting with all modalities. In addition, for example a supply of data recorded with first physical observation modality Mod_A using a camera, for example, is not suddenly "devalued" for further trainings of the generator when something has changed with the recorded setting. Thus, for example, the street scene may have permanently changed in such a way that after the original camera recordings, a roadway has been paved with a differently textured low-noise asphalt over a fairly long distance, or a lane has been conspicuously marked as a high-occupancy vehicle lane over a fairly long distance. The larger the area in which the data have been recorded, the more difficult it is to stay updated on such changes.

In addition, the data recorded with first physical observation modality Mod_A may also be further fully utilized, even when the sensor that is used for the physical data recording with second observation modality Mod_B is changed. For example, a radar sensor that is initially used for tests may subsequently prove to be unsuitable or too costly for use in series production in the vehicle. After the radar sensor is exchanged, it is sufficient to use this new radar sensor to record new radar signals in space Y. However, in this event it is not necessary to record new images in space X using the likewise installed camera.

The CycleGAN, the same as the conditional GAN, learns a map G of space X, in which the actual signals "live," into space Y, in which generated synthetic measured data y "live." In addition, the reverse mapping F of space Y into space X is learned. A first discriminator $D_x$ is learned which attempts to distinguish between generated data F(y) and real actual signals x. A second discriminator $D_y$ is learned which attempts to distinguish between generated data G(x) and real setpoint signals y. This may be expressed, for example, in the cost function terms $$L_{GAN}(G,D_y,X,Y,Z_1) = E_y[\log D_y(x)] + E_{x,z_1}[\log(1 - D_y(G(x,z_1)))]$$

and $$L_{GAN}(F,D_x,Y,X,Z_2) = E_x[\log D_x(x)] + E_{x,z_2}[\log(1 - D_x(F(y,z_2)))]$$

where $z_1$ and $z_2$ are samples of random variables $Z_1$ and $Z_2$. The use of random variables $Z_1$ and $Z_2$ is optional.

An example of a consistency term that monitors adherence to the consistency conditions $$F(G(x)) \approx x \text{ and } G(F(y)) \approx y \text{ is } L_{cyc}(G,F,X,Y,Z_1Z_2) = E_{x,z_1,z_2}[\|F(G(x,z_1),z_2) - x\|_1] + E_{y,z_1,z_2}[\|G(F(y,z_2),z_1) - y\|_1]$$

The overall cost function for the CycleGAN may then be written, for example, as $$L_{cycleGAN}(G,F,D_x,D_y) = L_{GAN}(G,D_y,X,Y,Z_1) + L_{GAN}(F,D_x,Y,X,Z_2) + \lambda L_{cyc}.$$

This cost function, analogously to the conditional GAN (cGAN), may also be expanded by an application term $L_P$ which is now a function of G and also of F: $L_P = L(G,F)$. This term may be added with weight $\gamma$, for example.

Similarity terms may likewise be added to the cost function for the CycleGAN. In contrast to the cGAN, there are now two terms for the two generators G and F:

$$L_{L1}(G) = E_{x,y}[\|y - G(x)\|_1]$$

and $$L_{L1}(F) = E_{x,y}[\|x - F(y)\|_1].$$

These terms may be added with weight $\mu$, for example.

In one further particularly advantageous embodiment of the present invention, hyperparameters which establish the relative weighting of terms with respect to one another in the cost function are optimized according to a predefined optimization criterion. These hyperparameters represent further degrees of freedom with which the generator is adaptable to the specific task. For example, a search space spanned by one of multiple hyperparameters may be searched in a predefined grid. This does not require that the optimization criterion is continuously a function of the hyperparameters.

As mentioned above with reference to the formulas, in one further particularly advantageous embodiment of the present invention, at least one actual signal includes real or simulated physical measured data of first physical observation modality Mod_A, as well as a sample that is drawn from a random variable. The sample may, for example, be added to the measured data. Noise that is added in this way has a double effect: on the one hand, numerous further variants may be generated from a predefined supply of actual signals in order to increase the variability of the training. On the other hand, further features may also be learned in the latent space.

In one further particularly advantageous embodiment of the present invention, an actual signal is selected that associates at least one actual label with at least a portion of the real or simulated physical measured data of first physical observation modality Mod_A.

A label may associate with the measured data an arbitrary statement, which originates from an arbitrary source. In the context of a classification task, the label may represent, for example, a class of an object that is indicated by the measured data. In the context of a regression task, the label may represent, for example, a regression value that relates to an object that is indicated by the measured data. The regression value may be, for example, a distance, an extent, or an orientation of an object. Data that are provided with labels (labeled) are often used for the monitored training of machine learning modules. In this context, a label often represents a statement that a machine learning module, after completion of training, is to deduce from the labeled data, such as real or simulated physical measured data of first physical observation modality Mod_A.

For example, the objective ultimately pursued with the collection of physical measured data of modality Mod_A may be to use a machine learning module to classify objects whose presence is indicated by these measured data. The label may then indicate, for example for a real or simulated image of a vehicle surroundings, which objects, such as roadway boundaries, traffic signs, or other road users, are present in the setting depicted in the image. With a predefined quantity of images and associated labels, the machine learning module may then be trained to correctly recognize the contained objects, even in images of unknown situations.

As one possible implementation, the actual signals of Mod_A may be supplemented with a further channel that contains the label information. For example, for a video image the labels may be added as semantic segmentation for each pixel. For a radar spectrum (in a distance-speed image, for example), it would correspondingly be added as an additional channel for each (multidimensional) FFT bin. For punctiform radar data (reflection points), the label may be added as an additional attribute for each reflection point. The label may contain not only a class, but also one or multiple regression values (for example, distance, extent, orientation of an object), one channel for each regression value. This is particularly advantageous in configurations when a modality is capable of particularly accurate estimation of such a parameter. As an example, a radar may directly measure the distance of an object, and transfer this information to the pixel space of a video image. The labeled data may be used for further machine learning algorithms.

In many cases, the association of labels with real or simulated physical measured data requires human labor, and therefore may take up a large portion of the total costs of a system that classifies objects using a machine learning module, for example. It has now been found that the above-described training method does not just enable the generator to translate the real or simulated physical measured data of first modality Mod_A in space X into synthetic measured data of second modality Mod_B in space Y. Rather, the association of the labels, contained in the actual signal, with the real or simulated physical measured data may also be at least partially transferred into space Y in various ways, so that the capital expenditure for labels in space X may also be further utilized in the subsequent processing of measured data of second modality Mod_B in space Y.

Thus, in one further particularly advantageous embodiment of the present invention, during the training of the generator a setpoint signal is selected that associates at least one setpoint label with at least a portion of the real or simulated physical measured data of second physical observation modality Mod_B. This means that the training method assumes that the training data in space X as well as the training data in space Y are labeled.

For example, the real or simulated physical measured data of second modality Mod_B may contain radar data, i.e., pieces of information that characterize radar reflections. The labels may then indicate, for example, objects that are present in the setting depicted with the radar reflections. If a machine learning module is trained in space Y using these training data, even for unknown configurations of radar reflections it may ascertain which objects are indicated by the radar reflections. This is a classification task in the broadest sense.

The actual labels contained in the actual signal are translated by the generator into transformed labels that "live" in the space of the setpoint labels. The cost function with which the generator is trained now contains a label term that assumes better values the greater the consistency of the generated labels with the setpoint labels.

Thus, based on labeled training data in space X and labeled training data in space Y, the generator learns to generate labeled synthetic measured data of second modality Mod_B in space Y from labeled real or simulated measured data of first modality Mod_A in space X.

The specific form of the label term in the cost function may be a function, for example, of the task for which a machine learning module is to be trained with the synthetic measured data generated by the generator. For classification tasks, for example a pixel-by-pixel cross entropy may be used. For regression tasks, for example the mean square error may be used.

The generator may include or be an artificial neural network (ANN), for example. This ANN includes a plurality of neurons and/or other processing units. The neurons and/or other processing units sum their particular inputs with weighting according to the trainable parameters of the generator, and form their output by applying a nonlinear activation function to the result of this weighted summation.

It is particularly advantageous that the number of neurons and/or other processing units decreases monotonically for each layer in a first layer sequence, and increases monotonically in a second layer sequence. In this way, a "bottleneck" forms between the end of the first layer sequence and the beginning of the second layer sequence, in which an intermediate result having a greatly reduced dimensionality in comparison to the input actual signals exists. This "bottleneck" allows the ANN to learn and compress relevant features. A better performance may thus be achieved, and the computing time may be reduced.

In one further particularly advantageous embodiment of the present invention, the ANN includes at least one direct connection between a first layer from the first layer sequence and a second layer from the second layer sequence. In this way, certain information may be selectively conducted past the stated "bottleneck," so that the information content in the transformed signals is increased overall. A direct connection is thus understood in particular to mean a connection that bypasses at least one layer from the first and/or second layer sequence, which otherwise would have to be passed through.

Once the generator is trained, the end state in the parameter set is represented with the parameters that characterize its behavior. For an ANN, these parameters may include, for example, weights with which the inputs that are supplied to a neuron or some other processing unit for activating this neuron or this processing unit are offset. This parameter set allows the generator to be arbitrarily duplicated without further training, and is therefore a separately sellable product.

Moreover, the present invention relates to a method for operating the generator, with which synthetic measured data of second observation modality Mod_B in space Y may be generated from labeled real or simulated physical measured data of first observation modality Mod_A in space X and subsequently labeled.

In this method, at least one actual signal that includes real or simulated physical measured data of first physical observation modality Mod_A is translated with the generator to form at least one transformed signal. For this transformed signal, quantitative contributions are ascertained which provide various portions of the real or simulated physical measured data of first physical observation modality Mod_A to form this transformed signal. These portions may be arbitrarily granular, all the way down to individual observations that are carried out with first modality Mod_A, such as image recordings or portions thereof.

Actual labels are ascertained in each case for these various portions. These actual labels may, for example, be identical to actual labels that have been provided according to the above-described method during the training of the generator. However, this is not absolutely necessary. Neither is it absolutely necessary for actual labels to have been provided at all during the training of the generator. It is only important that actual labels for these portions are available at the point in time at which the portions of the real or simulated physical measured data and their quantitative contributions to the transformed signal are identified.

At least one label for the transformed signal is ascertained from the quantitative contributions in conjunction with the actual labels.

The underlying logic here is that, due to the at least partial overlap of the areas that are observed with the two modalities Mod_A and Mod_B, the same features of objects that are present in these areas in each case make particularly important contributions to the observations made with both modalities Mod_A and Mod_B. Thus, when certain features stand out in each case in the observation made with first modality Mod_A on the one hand, and in the observation made with second modality Mod_B on the other hand, it is to be assumed that these originate from the same object. If a label is known for this object in space X, in which the observation has been made with modality Mod_A, this may be transferred to the corresponding observation in space Y.

For example, a stop sign appears in a camera image as an octagonal red surface with white lettering. When this camera image is translated into radar data by the generator, these radar data are likewise characterized, at least in part, by reflections that are to be associated with an octagonal object. This may be traced back into space X in which the camera image was recorded, so that the label "stop sign" assigned there may be transferred to the octagonal object that appears in the synthetic radar image.

As described above, the generator may in particular include and/or be an ANN that includes a plurality of neurons and/or other processing units. The neurons and/or other processing units may in particular be interconnected in such a way that they sum their particular inputs with weighting according to the trainable parameters of the generator, and form their output by applying a nonlinear activation function to the result of this weighted summation. In one particularly advantageous embodiment, in this configuration it may be ascertained, based on the transformed signal and using the architecture of the ANN, to what extent portions of the real or simulated physical measured data of first physical observation modality Mod_A have contributed decisively to at least one activation function. For example, a back-propagation may be utilized by the ANN for this purpose. The connection between quantitative contributions to the transformed signal and labels that are present may be established in this way.

It is entirely possible that the transformed signal contains multiple prominent features that are attributed to measured data with different labels (such as camera images that show different traffic signs). A label for a transformed signal that represents a class may then advantageously be ascertained by ascertaining a majority among actual labels that likewise represent classes. A label for a transformed signal that relates to a regression value may be ascertained based on a summary function of actual labels that likewise relate to regression values. The summary function may form an average value or median, for example.

Starting with a completely trained generator and actual labels for certain real or simulated physical measured data of imaging modality Mod_A in space X, with another of the methods provided by the present invention it is possible to provide physical measured data, obtained with second physical observation modality Mod_B in space Y, with labels. In spaces X and Y, measured data are advantageously utilized that relate to the same points in time, i.e., were physically recorded at the same time, for example. It may thus be ensured that the measured data relate to the same setting without changes in the interim.

In this method, at least one actual signal that includes real or simulated physical measured data of first physical observation modality Mod_A, for which at least one actual label is available, is translated with the generator to form at least one transformed signal.

At least one label for the transformed signal is provided. This label may be generated, for example, by a generator that has learned the labeling together with the transformed signal. However, the label may also be added subsequently, for example using the above-described method for operating the generator.

The transformed signal is compared to at least one further signal that includes real or simulated physical measured data of second physical observation modality Mod_B. Based on the label for the transformed signal in conjunction with the result of the comparison, at least one label for the further signal and/or a spatial offset between the two physical observation modalities Mod_A and Mod_B are/is ascertained.

Thus, for example, if a real signal recorded with second physical observation modality Mod_B resembles the transformed signal that has been obtained for an object with a known label, it may be concluded that the real signal recorded with modality Mod_B originates from that very object, and the known label may be associated with it. A machine learning module may then be trained with measured data that are recorded with modality Mod_B, using labels that have been taken from modality Mod_A. The use of real measured data instead of the synthetic measured data generated with the generator has the advantage that possible artifacts that could arise in the generation of synthetic measured data do not have an impact on the subsequent training of the machine learning module for the ultimate application.

For example, let it be assumed that x is an actual signal that "lives" in space X of the measured data delivered by modality Mod_A, and for which an actual label is known. The generator translates x into a transformed signal y' that "lives" in space Y of the measured data delivered by modality Mod_B. Since at least one label is available for x, one label is also available for y'. Let it now be assumed that y is the real further signal recorded with modality Mod_B. Depending on the design, it may be possible to transfer the labels of y' directly to y. In general, this requires an additional step for determining the offset between synthetic y' and real y depictions. This may be determined, for example, by comparing data y' and y (also over multiple measurements), for example using a correlation measure. The labels of y' may be transferred to y by taking this offset into account.

In general, it is not possible to label all data in Y, since the sensors used according to the two modalities Mod X and Mod Y have different ranges, resolutions, etc. For example, a camera has a much smaller range than a radar. In contrast, a radar has a smaller angular resolution; i.e., two closely situated objects cannot be separated. In addition, concealments may often be resolved by radar, whereas a video sensor detects only the front object. Thus, it is not possible to transfer the labels to the entire space of Mod_B, but, rather, only to certain overlapping areas of the modalities.

This approach has the advantage that no explicit shared coordinate depiction or transformation between Mod_A and Mod_B is necessary. The coordinate transformation is implicitly learned during the training. Such coordinate transformations are generally not trivial; for example, a video camera measures in the pixel space, while a radar measures in the distance space and angular space. Furthermore, a video camera cannot measure radial relative speeds of the objects, which is an important component of the radar measurement.

Ascertaining the offset may also be utilized by itself to calibrate the observation modalities Mod_A and Mod_B, i.e., to control disadvantageous effects of a spatial offset between these modalities Mod_A and Mod_B.

For example, if multiple sensors are installed in a vehicle, the calibration of the sensors with one another (extrinsic calibration) is generally not precisely known, and must first be laboriously measured. The knowledge about the calibration of the sensors is essential for building a surroundings model from various sensors.

It is desirable to automatically determine the extrinsic calibration online, i.e., after the sensors are installed.

For creating the training data, modalities Mod_A and Mod_B are installed in a test vehicle and accurately measured relative to one another so that the extrinsic calibration is known. The generator is trained as described above in order to generate data Y of Mod_B from data X of Mod_A.

In the application, the same modalities Mod_A and Mod_B are installed in the vehicle; however, the precise calibration of the used sensors relative to one another is unknown. To distinguish between the modalities used in the training, they are denoted by Mod_A2 and Mod_B2. For example, the video sensor or radar sensor may be installed slightly offset or slightly rotated. Recorded data x_2 of Mod_A2 are used as input for the trained generator in order to generate data y_2' of Mod_B2. Data y_2' correspond to the calibration of the training data that have been precisely measured, since the generator has learned this transformation.

The offset between synthetic data y_2' and measured data y_2 of Mod_B2 may be determined via the method described above. When this offset is added to the measured calibration, the calibration of the imprecisely installed modalities Mod_A2 and Mod_B2 relative to one another is now known.

The present invention also provides a further method. This method encompasses the complete process chain from the training of the generator to the control of a technical system.

In this method, a generator is trained as described above. By use of the trained generator, at least one synthetic signal of a second observation modality Mod_B is generated from an actual signal that includes real or simulated measured data of a first observation modality Mod_A. A machine learning module is trained with the synthetic signal.

Physical measured data of second observation modality Mod_B from the surroundings of a vehicle are recorded with at least one sensor. The trained machine learning module is operated by obtaining physical measured data, delivered by the sensor, as input and mapping the data onto at least one class and/or onto at least one regression value. A control signal is ascertained from the class and/or the regression value. The vehicle is controlled with the control signal.

The formation of the control signal may include in particular a check as to whether there is concern, based on the result of the evaluation in conjunction with the present or planned trajectory of the host vehicle, that the trajectory of an object in the surroundings of the host vehicle intersects this present or planned trajectory of the host vehicle. If this is the case, the control signal may in particular be directed toward changing the trajectory of the host vehicle in such a way that it is no longer intersected by the trajectory of the recognized object.

The methods may be implemented in particular completely or partially by computer. Therefore, the present invention further relates to a computer program that includes machine-readable instructions which, when executed on one or multiple computers, prompt the computer(s) to carry out one of the described methods. In this sense, control units for vehicles and embedded systems for technical devices which are likewise capable of carrying out machine-readable instructions are to be regarded as computers.

Moreover, the present invention relates to a machine-readable data medium and/or a download product that includes the parameter set and/or the computer program. A download product is a digital product that is transmittable via a data network, i.e., downloadable by a user of the data network, and that may be offered for sale in an online store, for example, for immediate download.

In addition, a computer may be equipped with the parameter set, computer program, machine-readable data medium, or download product.

Further measures that enhance the present invention are described in greater detail below with reference to figures, together with the description of the preferred exemplary embodiments of the present invention.

DETAILED DESCRIPTION OF EXAMPLE EMBODIMENTS

Figure 1:
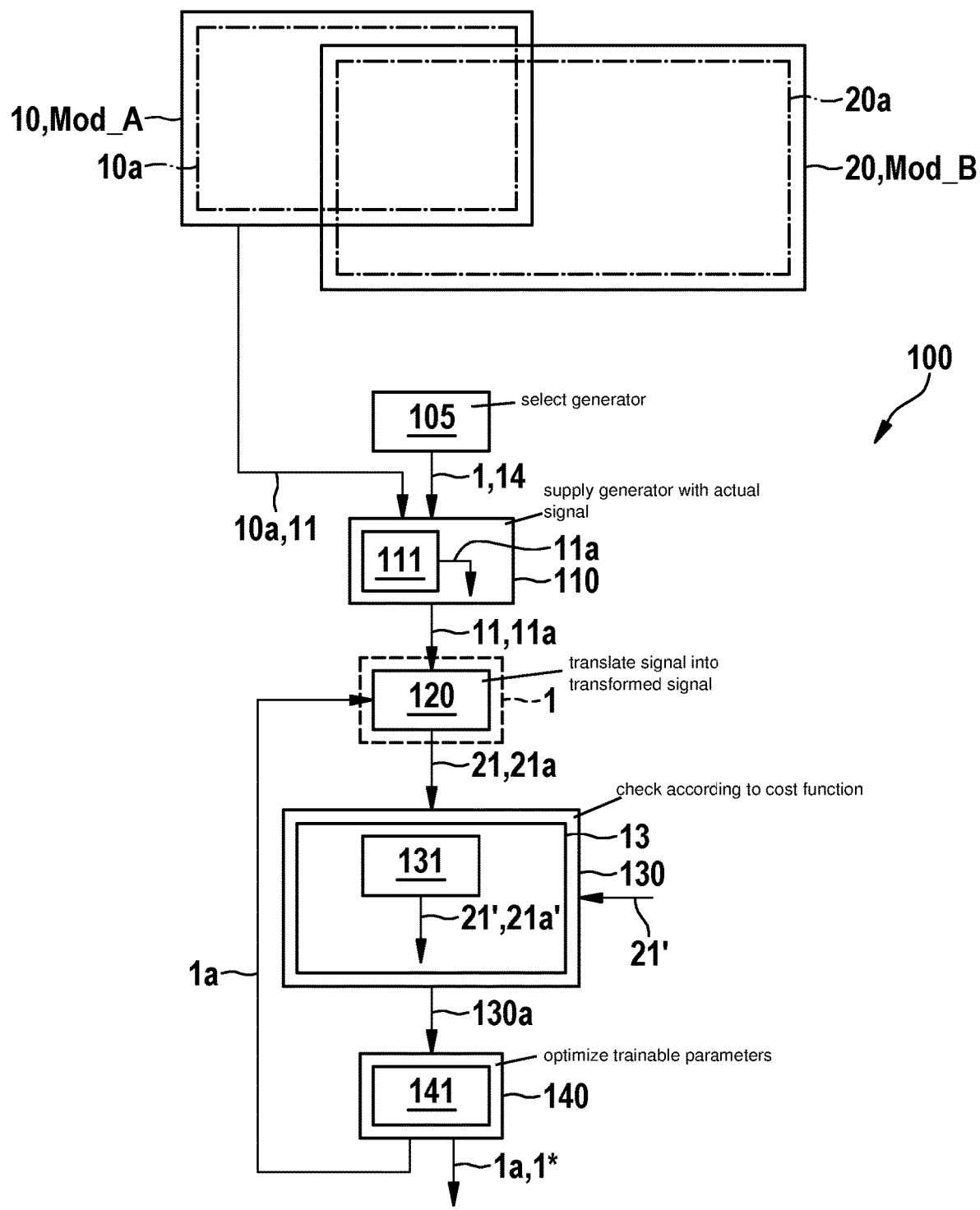
FIG. 1 shows one exemplary embodiment of training method 100 in accordance with the present invention.

FIG. 1 is a flow chart of one exemplary embodiment of training method 100. Method 100 assumes that an area 10 is observable with a first physical observation modality Mod_A. At the same time, an area 20 that overlaps area 10 is observable with a second physical observation modality Mod_B. Physical measured data 10a are obtainable by real or simulated observation of area 10. Physical measured data 20a are obtainable by real or simulated observation of area 20.

A generator 1 that includes an artificial neural network ANN is selected in step 105. Generator 1 is supplied with an actual signal that incudes real or simulated measured data 10a of modality Mod_A in step 110, it being possible for this actual signal 11 to be provided with one or multiple labels 11a according to block 111. Actual signal 11, in addition to real or simulated measured data 10a of modality Mod_A, may for example contain metadata that are collected together with measured data 10a. Such metadata may include, for example, settings or parameters of the measuring instrument used, such as a camera or a radar device.

The actual signal is translated into a transformed signal 21 with generator 1 in step 120. If labels 11a are present, they may be translated into transformed labels 21a by generator 1. A check is made according to a cost function 13 in step 130 concerning to what extent transformed signal 21 is consistent with at least one setpoint signal 21'. Trainable parameters 1a that characterize the behavior of generator 1 are optimized in step 140 in such a way that assessment 130a by cost function 13 is likely to be better for transformed signals 21 then obtained.

An example is shown within box 13 as to how assessment 130a may be ascertained. According to block 131, at least one setpoint signal 21' is selected that is provided with a label 21a'. Cost function 13 may thus include a comparison between transformed labels 21a and setpoint labels 21'.

According to block 141, in addition to generator 1, at the same time a discriminator module is also trained to distinguish transformed signals 21 from setpoint signals 21' in order to provide additional incentives for progress in the training of generator 1.

Parameters 1a that result at the end of the training establish trained state 1* of generator 1.

Figure 2:
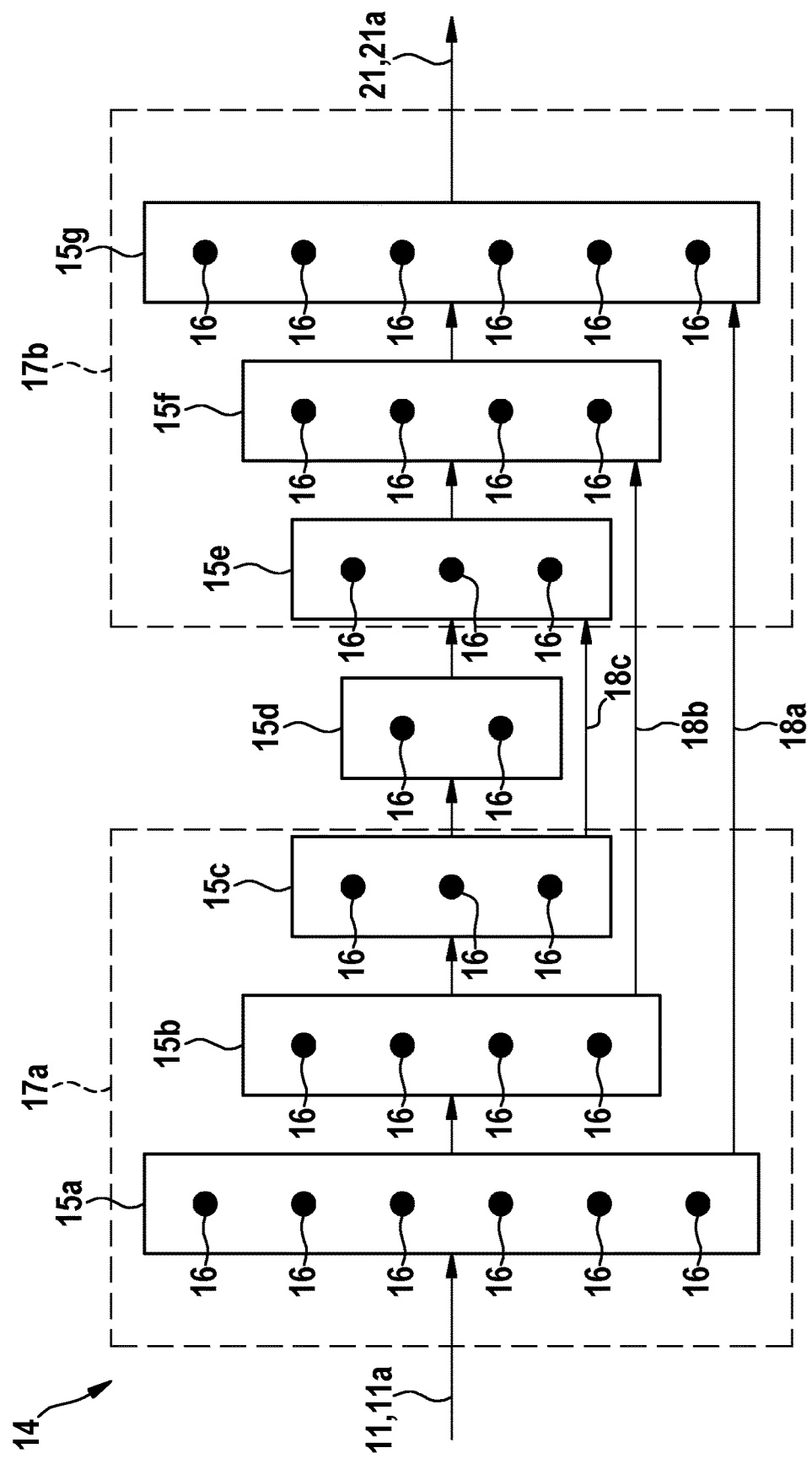
FIG. 2 shows an example of neural network 14 for use in generator 1 in accordance with an example embodiment of the present invention.

FIG. 2 schematically shows an example of an ANN 14 that is usable in generator 1. In this example, ANN 14 is made up of seven layers 15a through 15g, each of which includes neurons or other processing units 16. Layers 15a through 15c form a first layer sequence 17a in which the number of neurons 16 per layer 15a through 15c monotonically decreases. Layers 15e through 15g form a second layer sequence 17b in which the number of neurons 16 per layer 15e through 15g monotonically increases. Situated in between is layer 15d, in which a maximum compressed representation of actual signals 11 is present. ANN 14 additionally contains three direct connections 18a through 18c between layers 15a through 15c from first layer sequence 17a and layers 15e through 15g from second layer sequence 17b, which in the example shown in FIG. 3 each include the same number of neurons 16.

Figure 3:
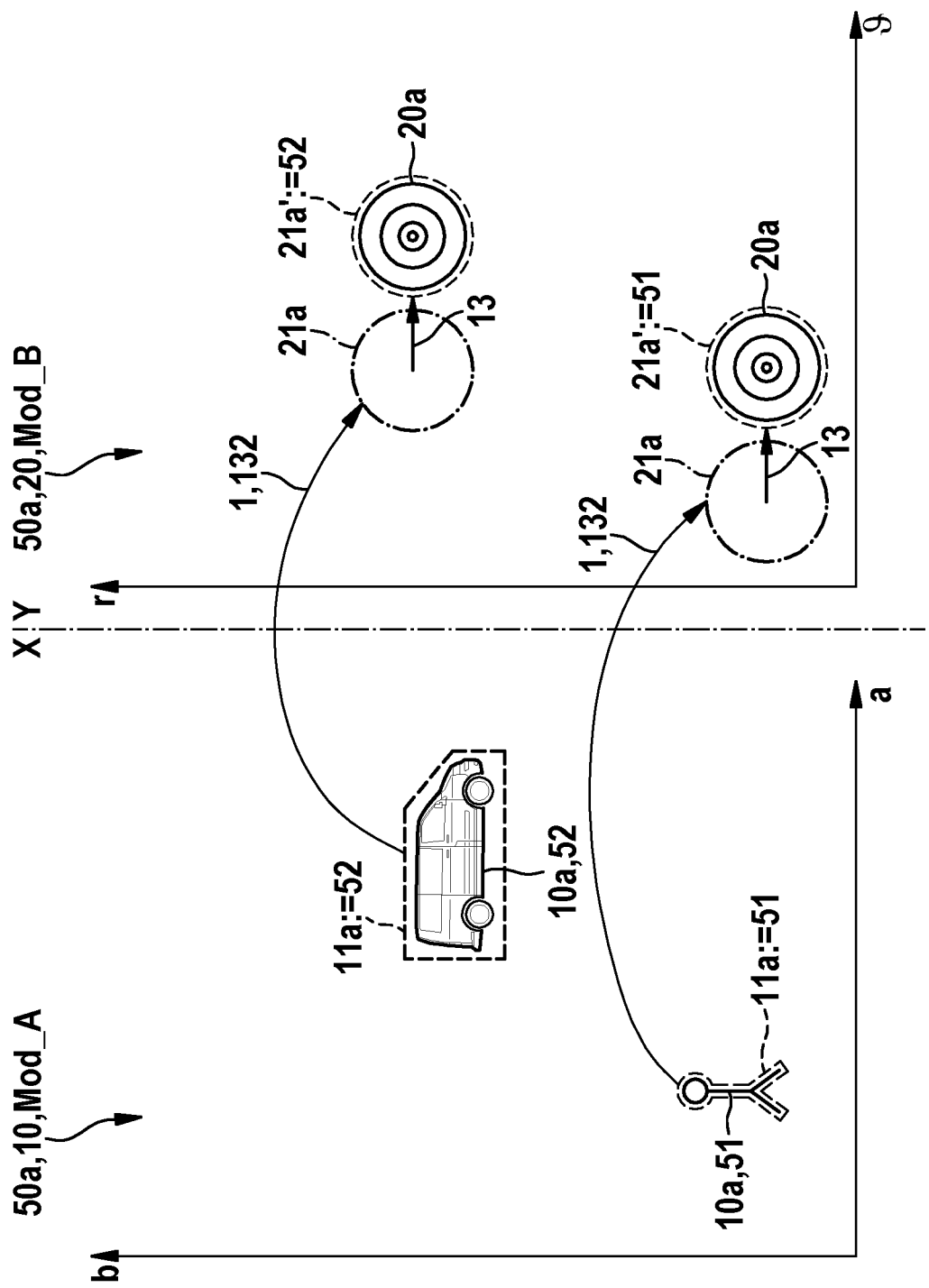
FIG. 3 shows an illustration of how the translation of actual labels 11a into transformed labels 21a may be trained in accordance with an example embodiment of the present invention.

FIG. 3 schematically illustrates how generator 1 may be trained to generate new labels 21a in space Y of the observations with modality Mod_B from labels 11a that are present in space X of the observations with modality Mod_A.

In the example shown in FIG. 3, camera images with a Cartesian coordinate system in coordinates a and b "live" in space X. As an example, a pedestrian 51 and another vehicle 52 are illustrated as observations 10a in surroundings 50a of a host vehicle 50, not illustrated in FIG. 3. The information that a pedestrian 51 or a vehicle 52 is involved forms particular label 11a.

When the same setting as modality Mod_B is observed with radar, observations 20a are, for example, the radar spectra shown in FIG. 3, or alternatively or also in combination are radar reflections, for example. The radar spectra "live" in space Y in coordinates $\theta$ (angle) and r (distance). Once again, as particular setpoint label 21a', the information that the radar spectra relate to a pedestrian 51 or to a vehicle 52 may be associated with the radar spectra.

According to step 120 of method 100, actual labels 11a are translated into transformed labels 21a in space Y. As described above, cost function 13 may check to what extent transformed labels 21a agree with setpoint labels 21a'. In the snapshot shown in FIG. 3, this agreement is still very poor. Cost function 13 is then a driving force for optimizing parameters 1a of the generator with the objective of improving the agreement.

Figure 4:
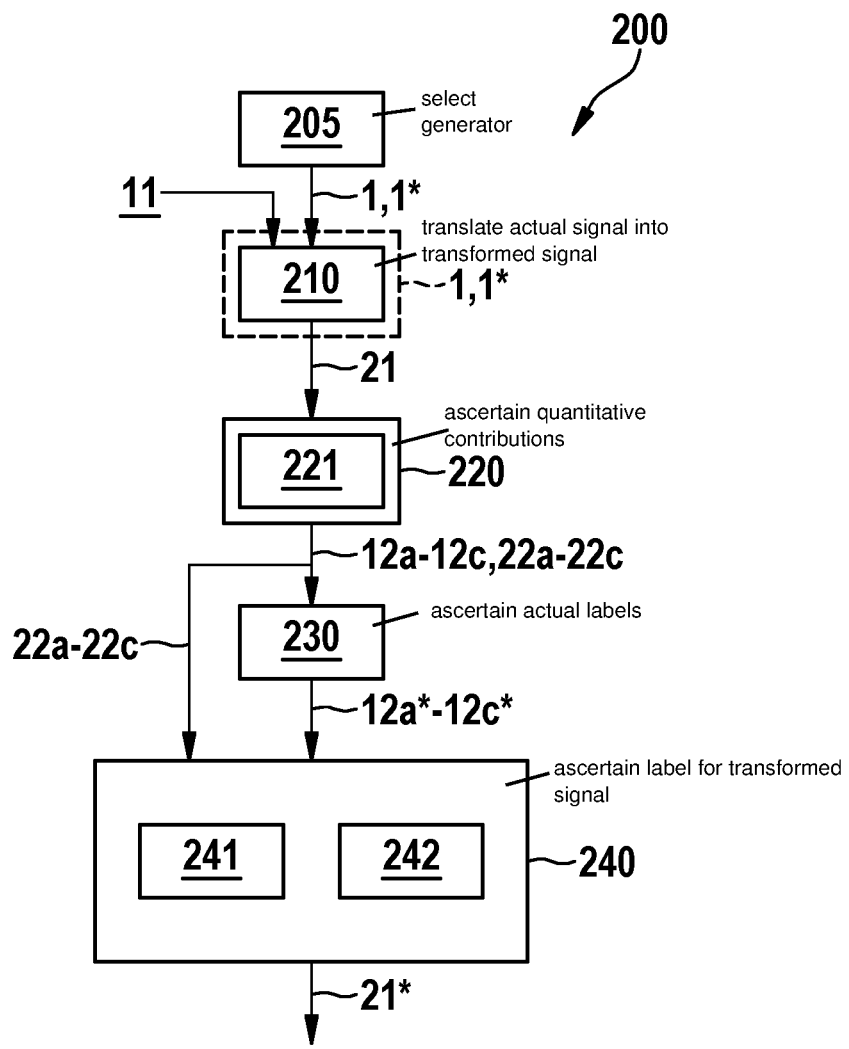
FIG. 4 shows one exemplary embodiment of method 200 for operating generator 1 in accordance with the present invention.

FIG. 4 is a flow chart of one exemplary embodiment of method 200 for operating generator 1, 1*. A generator 1 that contains an ANN 14 is selected in step 205. At least one actual signal 11 is translated into a transformed signal 21 with generator 1, 1* in step 210.

Quantitative contributions 22a through 22c, which provide various portions 12a through 12c of real or simulated physical measured data 10a of modality Mod_A, contained in the actual signal, to form this transformed signal 21, are ascertained in step 220. Actual labels 12a* through 12c* for the various portions 12a through 12c are ascertained in step 230. At least one label 21* for transformed signal 21 is ascertained from contributions 22a through 22c and actual labels 12a* through 12c* in step 240.

Two options are shown by way of example within box 240 for how label 21* may be ascertained. According to block 241, multiple actual labels 12a* through 12c*, which represent classes, may be combined over these classes via a majority. According to block 242, multiple actual labels 12a* through 12c*, which relate to regression values, may be combined using a summary function.

Figure 5:
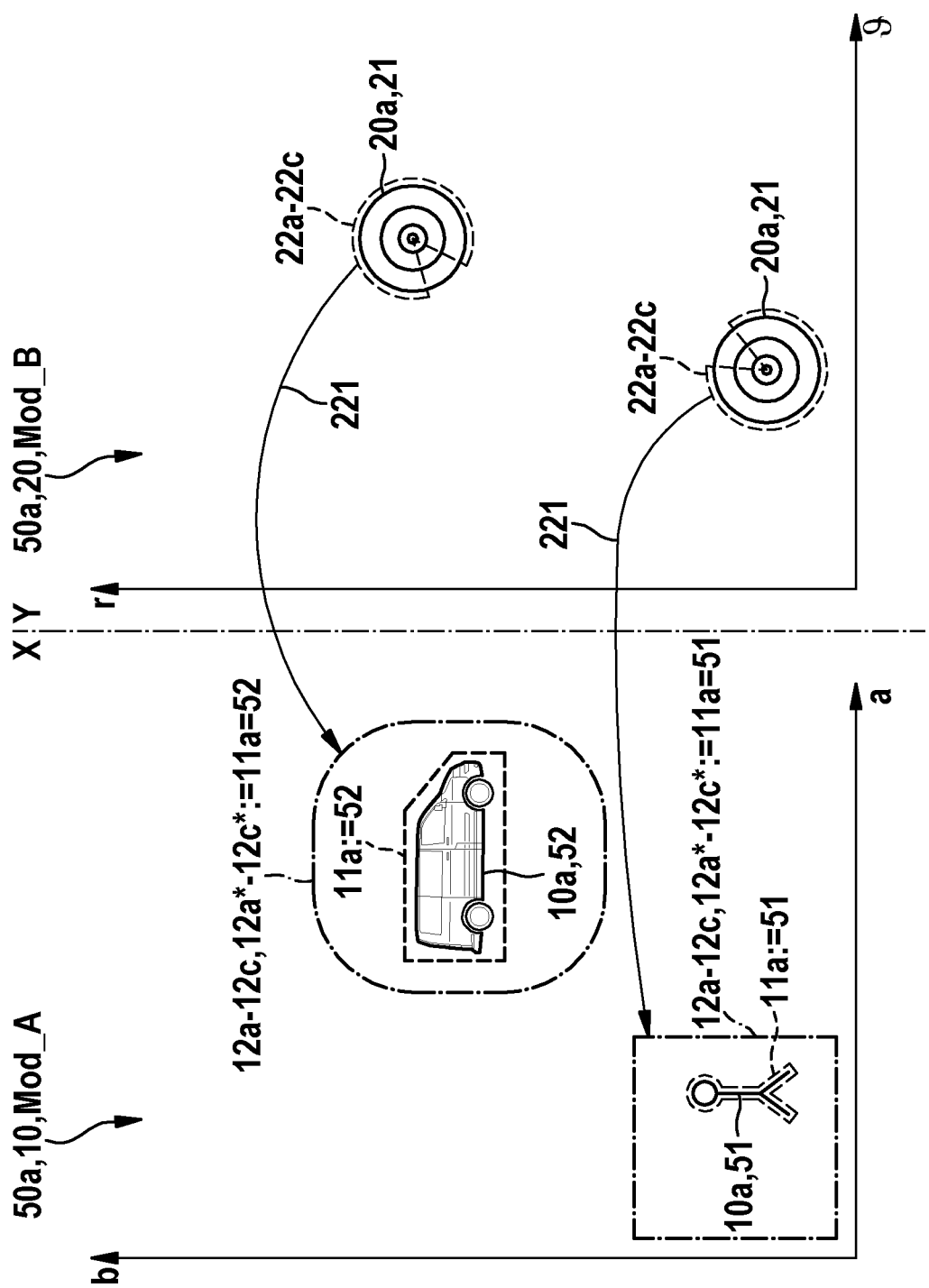
FIG. 5 shows an illustration of the method shown in FIG. 4.

Method 200 is illustrated in greater detail in FIG. 5. Spaces X and Y are the same as in FIG. 3, and the same objects are also present. However, in contrast to FIG. 3 it is assumed that no setpoint labels 21' are available in space Y for observations 20a in transformed signal 21.

In order to label observations 20a in transformed signal 21, quantitative contributions 22a through 22c are ascertained for which portions 12a through 12c of measured data 10a in space X have contributed to observations 20a. Portions 12a through 12c are areas in the selected illustration in FIG. 5. According to step 221 of method 200, the architecture of ANN 14 is used, for example via the back-propagation via ANN 14, to ascertain contributions 22a through 22c and portions 12a through 12c.

As illustrated in FIG. 5, when these areas contain labeled objects 51, 52 in X, these actual labels 12a* through 12c* may then be used to ascertain a label 21* for transformed signal 21. In the situation illustrated in FIG. 5, each of portions 12a through 12c includes only a single labeled object 51 or 52, so that the particular label may be directly set as label 21* for transformed signal 21.

Figure 6:
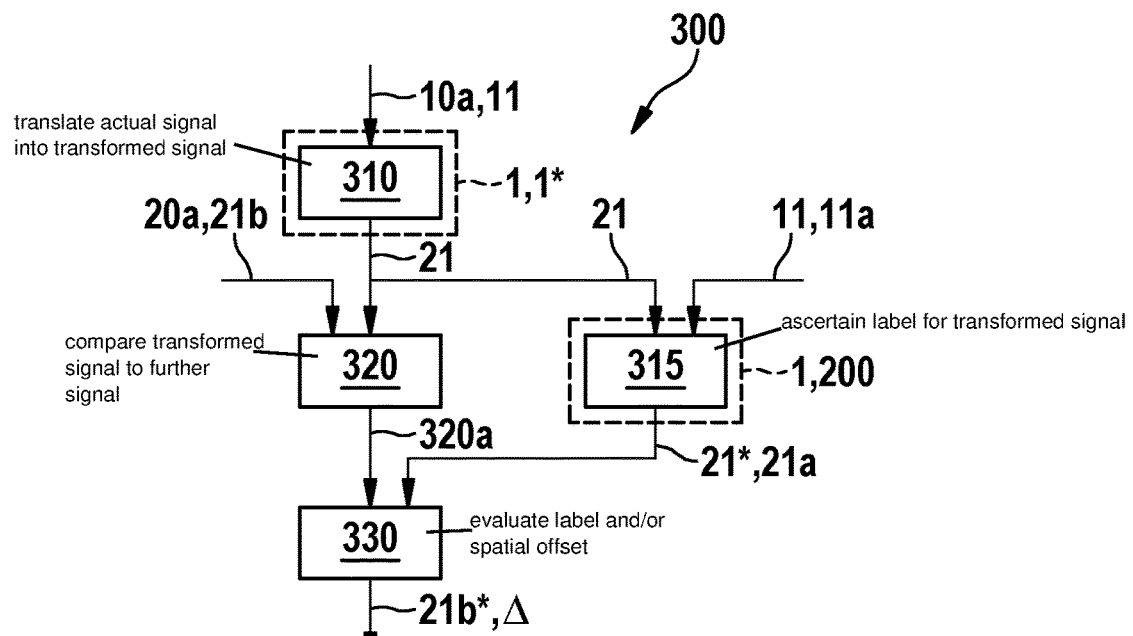
FIG. 6 shows one exemplary embodiment of method 300 for operating generator 1 in accordance with an example embodiment of the present invention.

FIG. 6 shows one exemplary embodiment of method 300 for operating generator 1. An actual signal 11, provided with an actual label 11a, with observations 10a of first modality Mod_A is translated by generator 1, 1* into a transformed signal 21 in step 310. At least one label 21a, 21* for transformed signal 21 is ascertained in step 315, which may be carried out directly during the generation of transformed signal 21 by a labeled generator 1 (label 21a) or, for example, also subsequently using above-described method 200 (label 21*). The transformed signal in space Y of modality Mod_B is compared to a further signal 21b that includes real or simulated measured data 20a of modality Mod_B in step 320. Analogously to signal 11, in addition to measured data 20a, signal 21b may include, for example, metadata that have been collected together with measured data 20a. Based on label 21* for transformed signal 21 in conjunction with result 320a of comparison 320, a label 21b* for further signal 21b, and/or a spatial offset Δ between observation modalities Mod_A and Mod_B, are/is evaluated in step 330.

Figure 7:
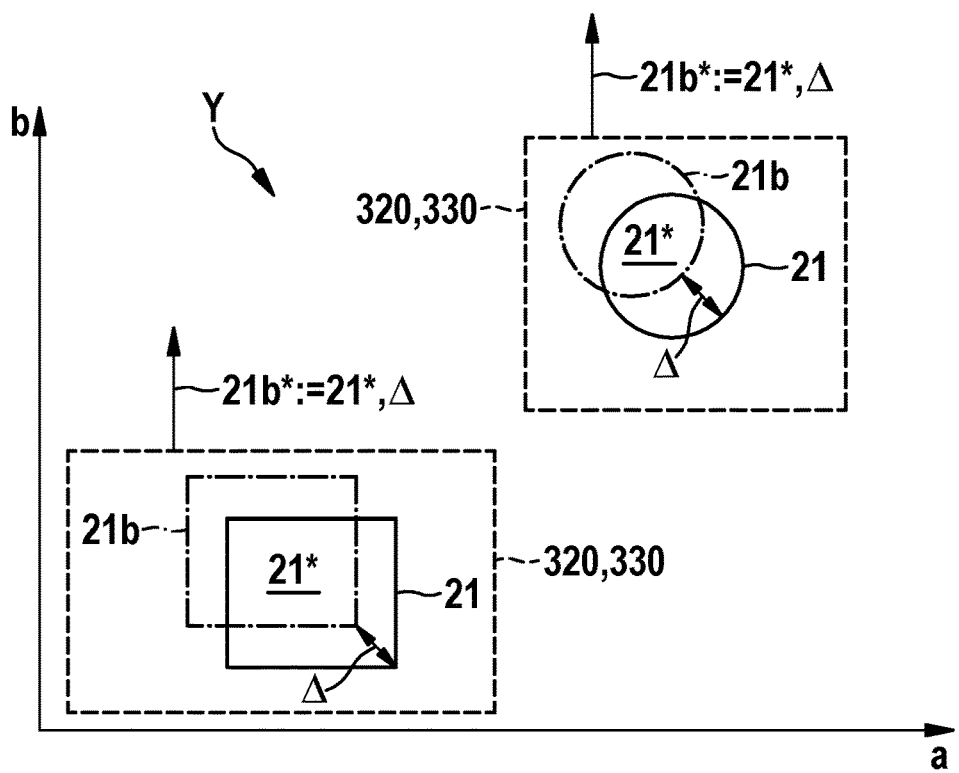
FIG. 7 shows an illustration of the method shown in FIG. 6.

FIG. 7 illustrates the method shown in FIG. 6. For better comprehensibility, in contrast to FIGS. 3 and 5, space Y in which transformed signals 21 "live" is a Cartesian space in coordinates a and b.

In the example shown in FIG. 7, transformed signals 21 illustrated as a rectangle and as a circle, and for which labels 21* have been ascertained in each case, are very similar to further signals 21b that have been obtained by measurement in space Y. On this basis, in each case the conclusion may be drawn in steps 320 and 330 of method 300 that further signals 21b each relate to the same objects as transformed synthetic signals 21. Accordingly, labels 21* of transformed signals 21 may once again be taken as labels 21b* for these further signals 21b. At the same time, spatial offset Δ between observation modality Mod_A, on the basis of which transformed signals 21 have been obtained, and observation modality Mod_B with which further signals 21b have been obtained, may be ascertained in this way.

Labels 21* of transformed signals 21 are based on original actual labels 11a from space X. These are not illustrated in FIG. 7 for the sake of clarity.

Figure 8:
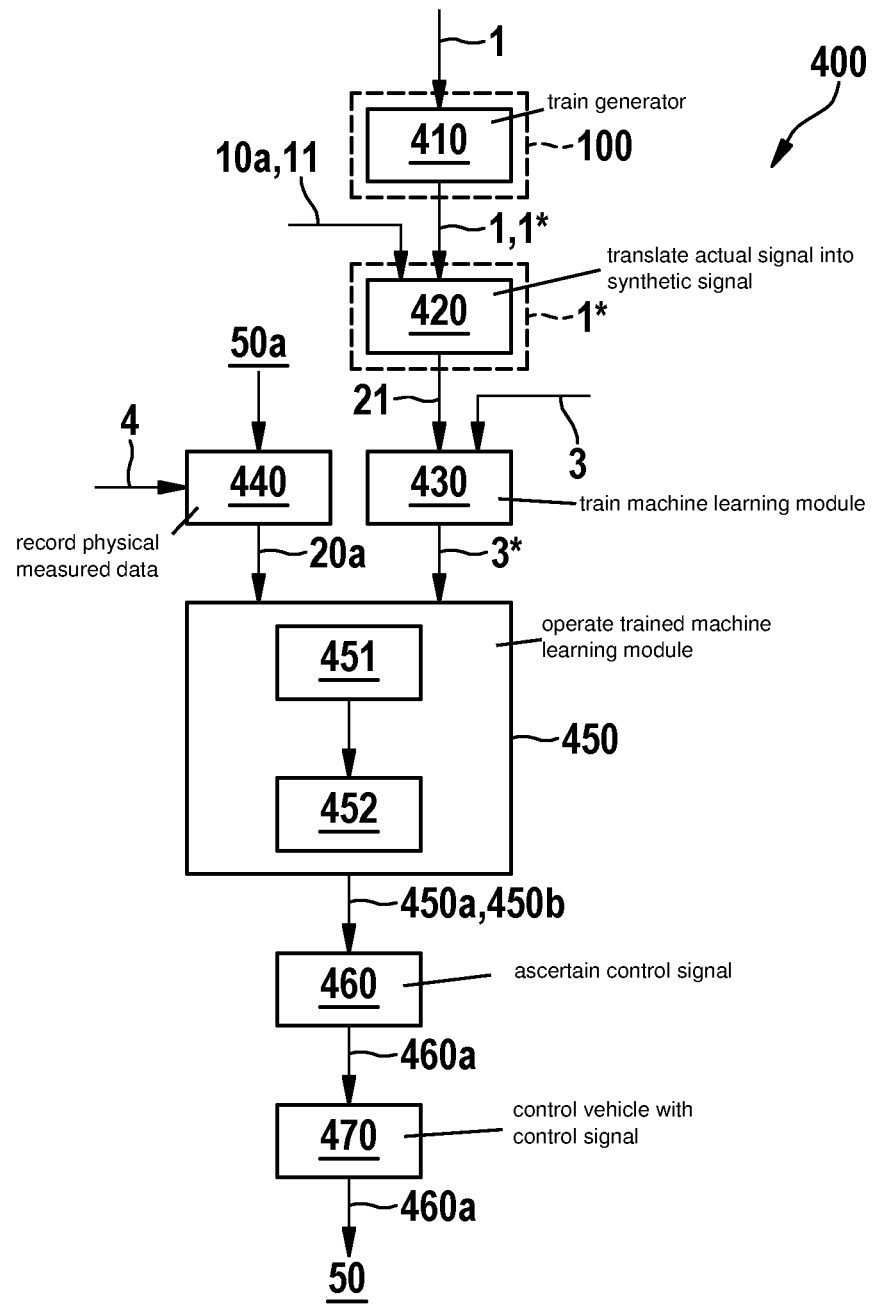
FIG. 8 shows one exemplary embodiment of method 400 that encompasses a complete process chain in accordance with the present invention.

FIG. 8 shows one exemplary embodiment of method 400, which encompasses the complete process chain from the training of generator 1 to the control of a vehicle 50. Generator 1 is trained with above-described method 100 in step 410, and thus achieves its trained state 1*. By use of trained generator 1*, an actual signal 11 that includes real or simulated measured data 10a of modality Mod_A in space X is translated into a synthetic (transformed) signal 21 of modality Mod_B in space Y in step 420. Based on synthetic signal 21, a machine learning module 3 is trained and thus achieves its trained state 3* in step 430. Concurrently, physical measured data 20a of the second observation modality are recorded from surroundings 50a of vehicle 50, using at least one sensor 4, in step 440.

Trained machine learning module 3* is operated in step 450 by obtaining measured data 20a as input according to block 451, and mapping these measured data 20 according to block 452 onto at least one class 450a and/or onto at least one regression value 450b. A control signal 360a is ascertained from class 450a and/or from regression value 450b in step 460. Vehicle 50 is controlled with control signal 460a in step 470.

What is claimed is:

1. A control method performed with a generator for generating, from real or simulated physical measured data of a first type of sensor that performs sensing in a first manner, synthetic measured data that a second type of sensor, which performs sensing in a second manner, is expected to output when the first type of sensor outputs the real or simulated physical measured data by performing the sensing in the first manner, wherein the sensing in the first manner, which is a first physical observation modality, and the sensing in the second manner, which is a second physical observation modality, are such that subjection of the sensors of the first and second types to a same environment results in a first set of sensed characteristics of a first area by the first type of sensor and in a different second set of sensed characteristics of a second area by the second type of sensor, the first and second areas at least partially overlapping, the method comprising the following steps:

training the generator by:
supplying the generator with at least one actual signal that includes real or simulated physical measured data from at least one observation of the first area;
translating, by the generator, the actual signal into a transformed signal that represents associated synthetic measured data that the second type of sensor is expected to output when the first type of sensor outputs the real or simulated physical measured data of the supplied at least one actual signal;
performing an assessment, using a cost function, concerning to what extent the transformed signal is consistent with one or multiple setpoint signals, at least one of the setpoint signals being formed from real or simulated measured data of the second physical observation modality for a situation represented by the actual signal; and
optimizing trainable parameters that characterize the behavior of the generator, with an objective of obtaining transformed signals that are better assessed by the cost function; and
subsequent to the training of the generator, using the trained generator to produce, based on output of the first type of sensor, data corresponding to output expected to be produced by the second type of sensor for ascertainment of a control signal that controls the vehicle.

2. The method as recited in claim 1, wherein:
the cost function contains a GAN term that assumes better values the more indistinguishable the transformed signal according to a discriminator module is from a predefined quantity of the setpoint signals; and
the discriminator module is additionally trained to distinguish transformed signals from the setpoint signals.

3. The method as recited in claim 2, wherein the cost function additionally contains a similarity term that assumes better values the greater the similarity of the transformed signal is according to a predefined metric to the setpoint signals.

4. The method as recited in claim 2, wherein the cost function additionally contains an application term that measures desirable properties of the transformed signal for an intended application.

5. The method as recited in claim 2, wherein:
a back-generator module is trained to back-translate transformed signals into signals of a type of the actual signal, the cost function additionally containing a back-GAN term that assumes better values the more indistinguishable the back-translated signals according to a further discriminator module are from the actual signal;
the further discriminator module is trained to distinguish the back-translated signals from the actual signal; and
the cost function contains a consistency term that is a measure for the extent that the actual signal is identically reproduced during translation by the generator and back-translation by the further generator.

6. The method as recited in claim 2, wherein hyperparameters which establish a relative weighting of terms with respect to one another in the cost function are optimized according to a predefined optimization criterion.

7. The method as recited in claim 1, wherein the at least one actual signal includes real or simulated physical measured data of the first physical observation modality, as well as a sample that is drawn from a random variable.

8. The method as recited in claim 1, wherein the actual signal associates at least one actual label with at least a portion of the real or simulated physical measured data of the first physical observation modality.

9. The method as recited in claim 8, wherein:
the at least one of the setpoint signals is selected that associates at least one setpoint label with at least a portion of the real or simulated physical measured data of the second physical observation modality;
the at least one actual label is translated by the generator into at least one transformed label that "live" in the space of the at least one setpoint label; and
the cost function contains a label term that assumes better values the greater the consistency of the at least one transformed label with the at least one setpoint label.

10. The method as recited in claim 1, wherein:
the generator includes and/or is at least one artificial neural network (ANN); and
the ANN includes a plurality of neurons and/or other processing units that sum their particular inputs with weighting according to the trainable parameters of the generator, and form their output by applying a nonlinear activation function to a result of the weighted summation.

11. The method as recited in claim 10, wherein the ANN is built layer by layer, and a number of neurons and/or other processing units decreases monotonically for each layer in a first layer sequence, and increases monotonically in a second layer sequence.

12. The method as recited in claim 11, wherein the ANN includes at least one direct connection between a first layer from the first layer sequence and a second layer from the second layer sequence.

13. The method as recited in claim 11, wherein:
the produced corresponding data is at least one synthetic signal of the second observation modality;
the output of the first type of sensor, based on which the corresponding data is produced, is a second actual signal that includes real or simulated measured data of the first observation modality;
the method further comprises:
training a machine learning module with the produced at least one synthetic signal;
recording physical measured data of the second observation modality from surroundings of the vehicle using the second type of sensor;
operating the trained machine learning module by obtaining physical measured data, delivered by the second type of sensor, as input and mapping the obtained data onto at least one class and/or onto at least one regression value; and
the control signal is ascertained from the class and/or from the regression value.

14. A non-transitory machine-readable data medium on which is stored a computer program that is executable by a processor, and that, when executed by the processor, causes the processor to perform a control method with a generator for generating, from real or simulated physical measured data of a first type of sensor that performs sensing in a first manner, synthetic measured data that a second type of sensor, which performs sensing in a second manner, is expected to output when the first type of sensor outputs the real or simulated physical measured data by performing the sensing in the first manner, wherein the sensing in the first manner, which is a first physical observation modality, and the sensing in the second manner, which is a second physical observation modality, are such that subjection of the sensors of the first and second types to a same environment results in a first set of sensed characteristics of a first area by the first type of sensor and in a different second set of sensed characteristics of a second area by the second type of sensor, the first and second areas at least partially overlapping, the control method comprising:
training the generator by:
supplying the generator with at least one actual signal that includes real or simulated physical measured data from at least one observation of the first area;
translating, by the generator, the actual signal into a transformed signal that represents associated synthetic measured data that the second type of sensor is expected to output when the first type of sensor outputs the real or simulated physical measured data of the supplied at least one actual signal;
performing an assessment, using a cost function, concerning to what extent the transformed signal is consistent with one or multiple setpoint signals, at least one of the setpoint signals being formed from real or simulated measured data of the second physical observation modality for a situation represented by the actual signal; and
optimizing trainable parameters that characterize the behavior of the generator, with an objective of obtaining transformed signals that are better assessed by the cost function; and
subsequent to the training of the generator, using the trained generator to produce, based on output of the first type of sensor, data corresponding to output expected to be produced by the second type of sensor for ascertainment of a control signal that controls the vehicle.

15. The method as recited in claim 1, wherein the production of the corresponding data using the trained generator includes:
   translating, using the trained generator, at least one further actual signal that includes real or simulated physical measured data of the first physical observation modality to form a further transformed signal;
   for the further transformed signal, ascertaining quantitative contributions which provide various portions of the real or simulated physical measured data of the first physical observation modality to form the further transformed signal;
   ascertaining actual labels, in each case, for the various portions of the real or simulated physical measured data of the first physical observation modality; and
   ascertaining at least one label for the further transformed signal from the quantitative contributions in conjunction with the actual labels.

16. The method as recited in claim 15, wherein:
   the generator includes an artificial neural network (ANN) that includes and/or is a plurality of neurons and/or other processing units, the neurons and/or other processing units summing their particular inputs with weighting according to the trainable parameters of the generator, and forming their output by applying a nonlinear activation function to a result of the weighted summation; and
   starting from the transformed signal and using the architecture of the ANN, an extent is ascertained to which portions of the real or simulated physical measured data of the first physical observation modality have contributed decisively to at least one activation function.

17. The method as recited in claim 15, wherein a label for the further transformed signal that represents a class is ascertained based on a majority among actual labels that also represent classes.

18. The method as recited in claim 15, wherein a label for the further transformed signal that represents a regression value is ascertained based on a summary function of the actual labels that also represent regression values.

19. A control method performed with a generator for conversion of real or simulated physical measured data that relate to observation of a first area with a first physical observation modality, into synthetic measured data that relate to observation of a second area with a second physical observation modality, the first area and the second area at least partially overlapping, the method comprising the following steps:
   training the generator by:
      supplying the generator with at least one actual signal that includes real or simulated physical measured data from at least one observation of the first area;
      translating, by the generator, the actual signal into a transformed signal that represents associated synthetic measured data;
      performing an assessment, using a cost function, concerning to what extent the transformed signal is consistent with one or multiple setpoint signals, at least one of the setpoint signals being formed from real or simulated measured data of the second physical observation modality for a situation represented by the actual signal; and
      optimizing trainable parameters that characterize the behavior of the generator, with an objective of obtaining transformed signals that are better assessed by the cost function; and
   subsequent to the training of the generator, performing the following steps:
      translating, using the trained generator, at least one further actual signal that includes real or simulated physical measured data of the first physical observation modality, for which at least one actual label is available, to form a further transformed signal;
      ascertaining at least one label for the further transformed signal;
      comparing the further transformed signal to a further signal that includes real or simulated physical measured data of the second physical observation modality;
      based on the label for the further transformed signal in conjunction with a result of the comparison, ascertaining: (i) at least one label for the further signal, and/or (ii) a spatial offset between the first physical observation modality and the second physical observation modality; and
      ascertaining a control signal based on the at least one label and/or the spatial offset for controlling the vehicle with the control signal.

20. The method as recited in claim 19, wherein the at least one label for the further signal is ascertained based on the label for the further transformed signal in conjunction with a result of the comparison.

21. The method as recited in claim 19, wherein spatial offset between the first physical observation modality and the second physical observation modality is ascertained based on the label for the further transformed signal in conjunction with a result of the comparison.

* * * * *